United States Patent

West

[15] 3,653,410
[45] Apr. 4, 1972

[54] PLUGS AND CLOSURES

[72] Inventor: Derek West, Dorset, England
[73] Assignee: Flight Refueling Limited, London, England
[22] Filed: Feb. 28, 1969
[21] Appl. No.: 803,338

[52] U.S. Cl. ................................................138/89, 176/30
[51] Int. Cl. ..............................................................F16l 55/10
[58] Field of Search ...................138/89; 220/55, 55 E, 55 G, 220/55 M; 176/30, 31, 79, 80

[56] References Cited

UNITED STATES PATENTS

| 3,125,123 | 3/1964 | Roche et al. | 138/89 |
| 3,140,730 | 7/1964 | Costes | 138/89 |
| 3,157,579 | 11/1964 | Hummel | 176/30 |

Primary Examiner—Laverne D. Geiger
Assistant Examiner—Richard J. Sher
Attorney—Arthur B. Colvin

[57] ABSTRACT

Cam-operated plugs or closures for use strut-like members the closing of openings in the fuel element stack pipes of atomic reactors. The plugs have a plurality of locking members mounted on the plug body, which locking members are pivotable by movement of a cam arrangement to a locking position in which they project beyond the periphery of the plug to engage the wall of the opening to prevent the plug from being withdrawn from the opening. The locking members comprise strut-like members which are arranged so that a force applied to the locking members by a tendency to withdraw the plug from the opening is a substantially compressive force.

11 Claims, 3 Drawing Figures

DEREK WEST
INVENTOR

BY ARTHUR B. COLVIN
ATTORNEY

Patented April 4, 1972
3,653,410
3 Sheets-Sheet 3
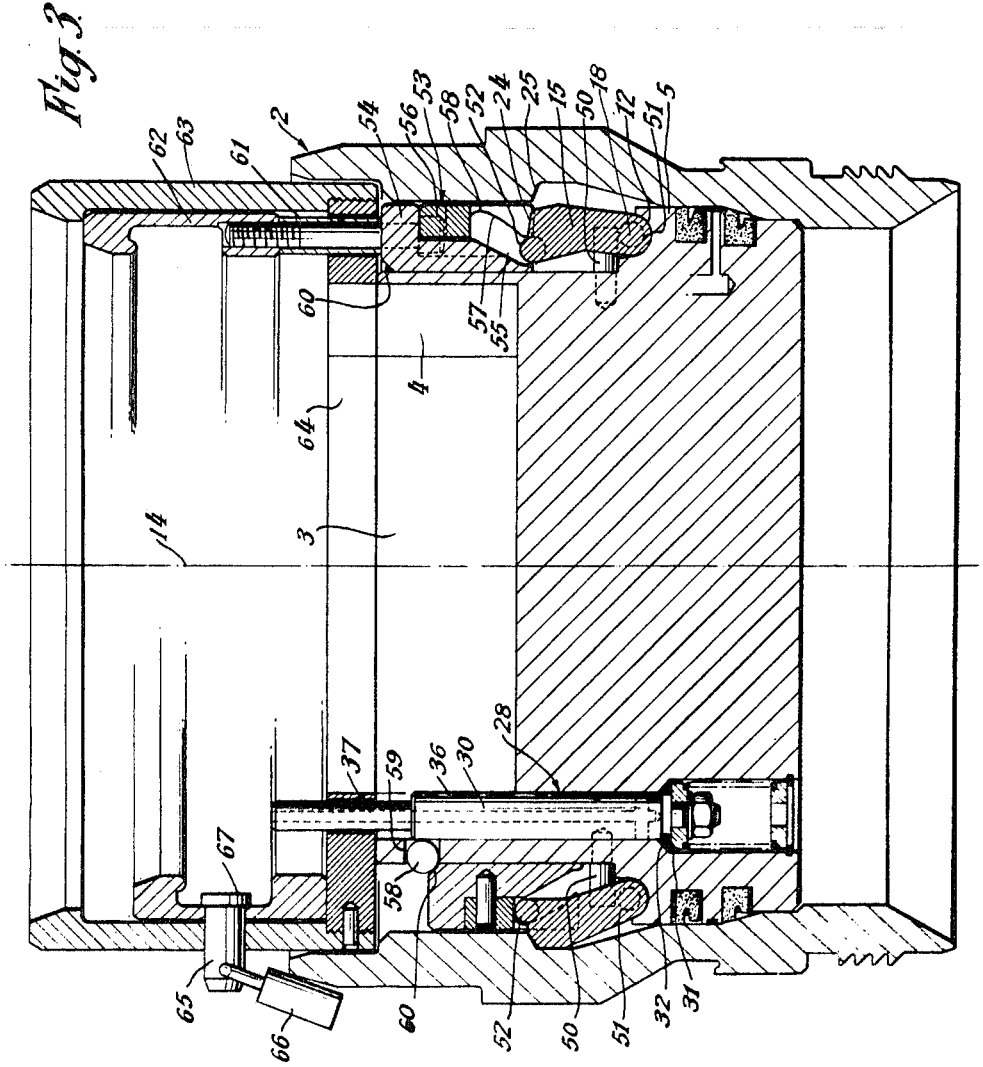
DEREK WEST
INVENTOR
BY ARTHUR B. COLVIN
ATTORNEY

PLUGS AND CLOSURES

This invention relates to plugs or closures for closing openings such as the bores of conduits, orifices and the like. The term plugs is intended to include not only members which themselves wholly block the openings in which they are mounted, but also members which, when located in said openings, provide a closable opening of smaller diameter than the diameter of the opening.

Such plugs are, in some applications, required to withstand high pressures tending to force them out of the openings which they serve to close. One particular example of their use is in the fuel element stack pipes of atomic reactors where, particularly in advanced gas cooled reactors in which the fuel elements are attached directly to the plugs, the blowing out of one of the plugs would result in a very dangerous situation due to the release, not only of hot gases, but also of radio active material.

It is therefore the object of the present invention to provide a plug having positive locking means for retaining it in position.

According to the present invention there is provided a plug including a body adapted to make a fluid tight joint with a peripheral surface on the wall of a member surrounding the said plug, locking means comprising a plurality of locking members pivotally mounted on the plug body, the locking members being pivotable by cam means between a retracted position and a locking position in which locking position the locking members project laterally outwardly beyond the periphery of the plug to engage with abutments in the said wall facing towards the inner end of the plug to prevent the plug from being withdrawn from the member.

The locking members preferably comprise strut-like members which, when in the locking position, are inclined outwardly towards the outer end face of the plug to engage said abutments, the arrangement being such that a force applied to the locking members by a tendency of the plug to withdraw from the opening is a substantially compressive force.

The cam means may comprise a cam ring movable relative to the plug body, the locking members each having a cam follower engageable in a cam slot in said cam ring, movement of the ring relative to the body causing the cam followers to move along the cam slots to thereby cause the locking members to be moved between their retracted and locking positions. The cam ring may be rotatably mounted in the body or may be axially slidable therein. The cam ring may be provided with abutment surfaces which, when the locking members are in their locking positions are engaged thereby the said abutment surfaces being so arranged that a force applied to them by the locking members, due to a tendency of the said locking members to move towards their retracted position, has no component acting in a direction to move the cam ring to retract the locking members.

Subsidiary locking means may be provided to prevent relative movement of the cam ring and the body when the main locking members are in their locking position, the subsidiary locking means being released by engagement with the plug of a grab or other manipulating device capable of moving the cam ring and removing the plug from the opening. Alternatively, or in addition, a subsidiary locking device may be provided, the release of which is accompanied by the operation of means for equalising the pressure on both sides of the plug so that the latter cannot be unlocked whilst there is a pressure difference across the plug.

Two embodiments of the invention will now be described, by way of example only, with reference to the accompanying drawings in which:

FIG. 3 shows a sectionalized view of a plug in which the cam ring slides axially.

Figure 1:
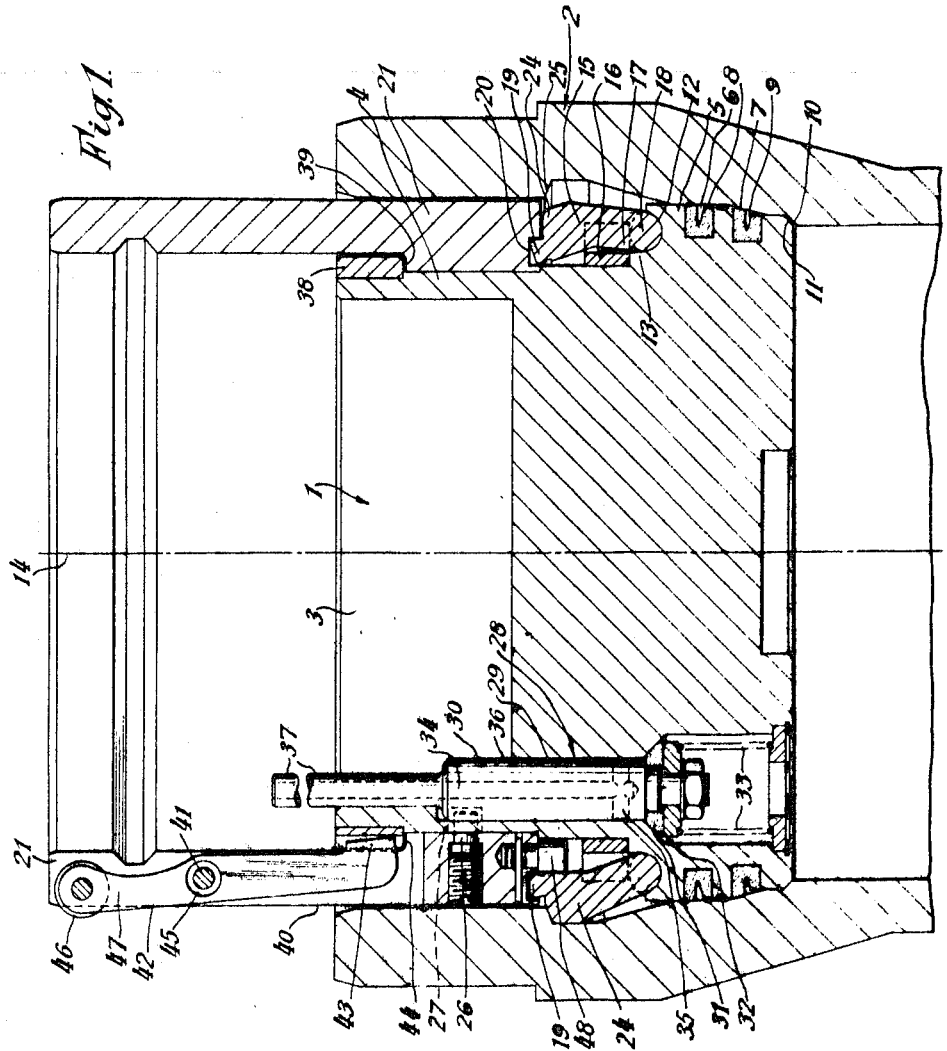
FIG. 1 shows a sectioned view of a plug having a rotary cam ring.

Referring now to FIG. 1 the plug 1 closes the opening in a conduit 2. The plug has a main body 3 of circular cross section, the peripheral surface of which is stepped so that the outer portion 4 is of smaller diameter than the inner portion 5. The inner portion 5 of the plug fits relatively closely in the opening and has therein annular grooves 6 and 7 to receive respectively sealing rings 8 and 9 which engage the wall of the conduit to provide a fluid-tight seal. The inward movement of the plug is limited by a chamfered abutment 10 on the wall of the conduit which engages with an annular chamfered portion 11 of the plug.

Five part-circular grooves 12 are equally spaced around the plug on the shoulder 13 formed between the greater and smaller diameters of the plug body 3. The grooves 12 are each tangential to a circle about the plug axis 14. Part-cylindrical ends 18 of locking members 15 are located in each of the grooves 12 and are retained therein by a ring 16 located about the smaller diameter portion 4. The locking members 15 are located in recesses 17 in the ring 16, the members 15 having trunnions co-axial with the part cylindrical ends 18 constrained by the ring 16 to retain the locking members in the part circular grooves 12. The locking members are thus retained in engagement with the plug whilst being free to pivot about the axis 18 of the part circular grooves 12. The locking members 15 have, formed integrally therewith, cam pegs 19 which are engaged in a cam slot 20 formed in a cam ring 21.

The locking members 15 are of strut-like configuration and have shoulders 24 which, when the locking members are moved to the locking position, engage with abutments 25 on the wall of the conduit. The abutments 25 may be a series of individual abutments, each associated with a corresponding one of the locking members, or may be a circumferential recess machined in the wall of the conduit. The abutments 25 face towards the inner end of the plug so that when the shoulders 24 engage the abutments 25, the plug cannot be removed from the conduit. The arrangement is such that a force applied to the locking members 15 by a tendency of the plug to withdraw from the opening is a substantially compressive force.

Figure 2:
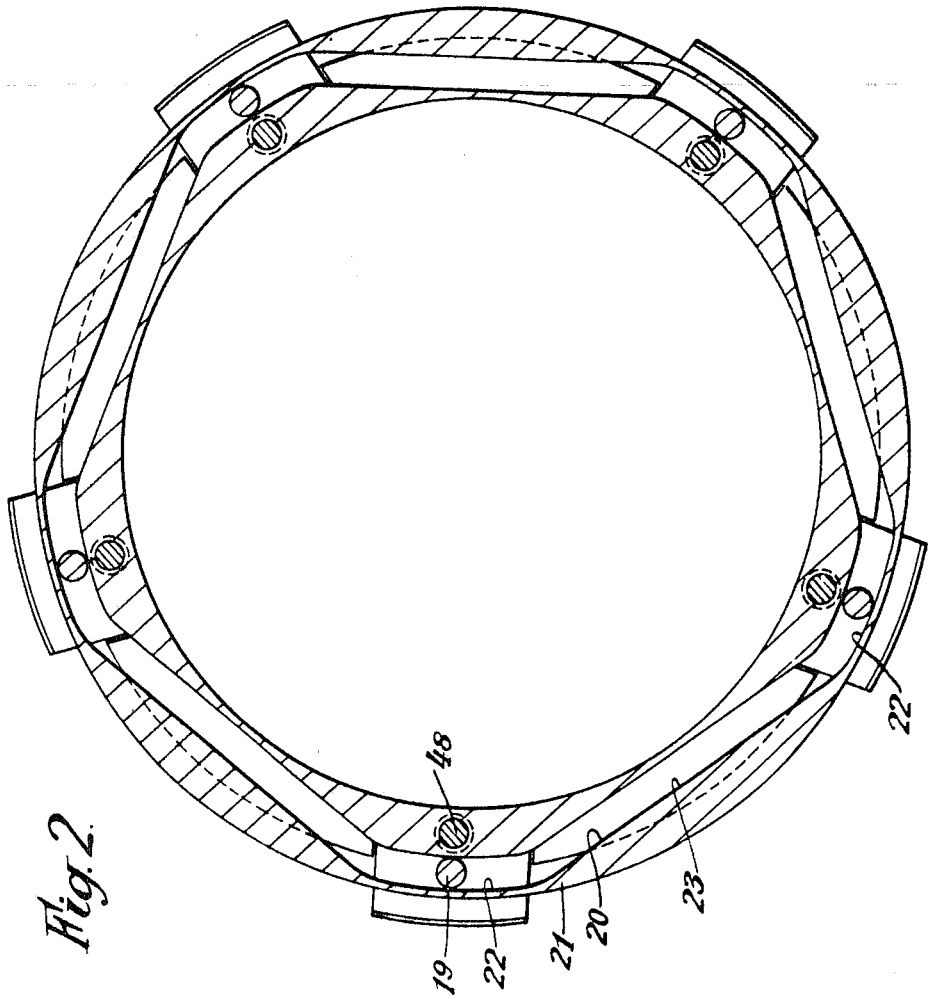
FIG. 2 shows a section plan view of the plug shown in FIG. 1.

As shown in FIG. 2, the cam slot is a substantially annular slot of 5 equal segments each associated with one of the locking members 15. Each cam segment has a first radiussed portion 22 which extends about a radius struck from the axis 14 and a second portion 23 which is a straight part of the slot interconnecting the portion 22 with the portion 22 of adjacent cam segment. The center section of the portion 23 is thus at a smaller distance from the center of the ring than the portion 22. Thus, when the cam pegs 19 of the locking members 15 are located in the portions 22 the locking members are in the outer, or locking, position as shown on the left-hand side of FIG. 1 while when the cam pegs 19 are in the center section of portions 23 the locking members 15 are in the retracted position as shown on the right-hand side of FIG. 1. When the locking members 15 are in the retracted position they are contained within the periphery of the plug to thereby enable the plug to be withdrawn from the opening in the conduit.

Reaction pins 48 are secured to the cam ring 21 adjacent each of the portions 22 of the cam slot 20. The axis of each of the pins 48 is parallel to the longitudinal axis 14 of the plug. The pins 48 are so positioned that when the locking members 15 are in the locking position, the pins 48 are adjacent the main body of the locking members and lift the cam pegs 19 slightly clear of the surface of the cam slot. Thus a force applied to the locking members radially inwardly due to a tendency of the locking members to move towards their retracted position is applied against the pins 48, and thus there is no component acting on the cam pegs 19 to rotate the cam ring 21 or to apply an excessive load on the cam pegs 19.

Rotational movement of the cam ring 21 is limited to approximately 45° by a pin 26 carried by the rotatable ring 21, which pin 26 projects radially inwardly from the cam ring into a part circumferential slot 27 in the main body 3. Subsidiary locking means co-operable with the pin 26 is provided by a valve arrangement 28 mounted in a stepped bore 29 extending through the main body 3. The valve arrangement has a valve stem 30 carrying a valve seal 31 which is biassed into engagement with a valve seat 32 on the body 3 by a coil compression spring 33 to provide a fluid tight seal. The stem 30 of the valve projects axially from the outer face of the plug body 3 and has an axial passage 34 extending from its outer end to a diametrical bore 35 adjacent the round seat 32 so that when the closure member 30 is displaced in an axially inward direction, a fluid passage is provided through the plug. The stem 30 is stepped to provide smaller and larger diameter portions thereof and, when the valve seal 31 is seated on the valve seat 32 the larger diameter portion 36 of the valve stem 30 projects into the part circumferential slot 27 in the plug and, by obstructing movement of the pin 26 carried by the cam ring 21, prevents the cam ring 21 from being rotated to retract the locking members. Axial inward movement of the valve stem to unseat the valve seal 31 brings the smaller diameter portion 37 of the valve stem into register with the slot 27, thus removing the obstruction to the rotation of the cam ring 21.

The cam ring 21 extends axially outwardly beyond the plug body 3, being retained thereon by a stop ring 38 secured to the body 3 at its periphery and engaging with shoulder 39 on the cam ring 21 to locate the cam ring relative to the body. The axially projecting portion of the cam ring 21 is formed with a plurality of longitudinal slots 40, only one of which is shown, in each of which is pivotally mounted, about an axis 41 tangential to the axis 14 of the plug, a two-armed locking lever 42. The lower arm 43 of the lever 42 is normally engaged with a notch 44 in the stop ring 38, the arm being urged into the notch by a torsion spring 45 located about the axis 41. When the lever 42 is in this position, a roller 46 mounted on the upper arm 47 projects radially outwardly beyond the periphery of the cam ring 21.

The plug is intended to be manipulated for insertion and removal from the opening in the conduit by a charge machine which is not illustrated. The charge machine includes a grab device which engages with, and is latched onto, the cam ring 21. The grab device also includes an outer sleeve which fits over the axially projecting portion of the cam ring 21, and an inner sleeve which passes within the said projecting portion.

Thus, when the charge machine is coupled to the plug, the outer sleeve thereof engages the rollers 46 on the upper levers of the locking lever 42 to withdraw the arms 43 from the notches 44 in the stop ring 38. The inner sleeve of the grab device engages the axially projecting end of the valve stem 30 and moves it to unseat the valve seal 31 from the seat 32 to thereby remove the obstruction from the path of the pin 26 on the cam ring 21 so that the cam ring can be turned by the grab to retract the locking members.

Thus, rotation of the cam ring to release the locking members can take place only if the grab device is properly coupled to the plug and the interior of the conduit is in communication with the charge machine so that the pressures on both sides of the plug are equalized.

Referring now to the alternative embodiment illustrated in FIG. 3 this embodiment is similar to that described with reference to the FIGS. 1 and 2 and like parts will have like reference numerals.

The plug has a main body 3 of circular cross section the peripheral surface of which is stepped as described previously to have an upper, outer, portion of smaller diameter and a lower or inner portion of larger diameter. As before the locking members 15 are located in part circular grooves 12, but in this embodiment, the locking members are retained in the grooves by locating pins 50 secured to the main body 3 of the plug, the outer ends of the pins lying adjacent each side of the locking members 15 and engaging the trunnions 51 formed on either side of the locking members 15 so that the locking members 15 are retained in engagement with the grooves 12 in the plug while being free for pivotal movement about the axis 18.

The locking members 15 extend towards the outer end of the plug and each carries, at its outer end, a pair of co-axial trunnions which form a cam peg 52, the axis of which is parallel to the pivot axis 18. A cam sleeve 53 is slidable on the smaller diameter portion 4 of the body of the plug, the cam sleeve comprising an inner sleeve 54 having on its inner end a plurality of flat faces 55 tangential to a circle about the axis 14 each face being associated with a corresponding one of the pegs 52 on the locking members 15. An outer sleeve member has thereon a plurality of inclined flat faces 57 each spaced from, and substantially parallel to, the inclined faces on the inner sleeve 54 to form a cam slot. A longitudinal slot 58 is formed in the center of each of the inclined faces 57, the slots being adapted to receive and locate a locking member 15. The pegs 52 on each of the locking members extend into the spaces formed between the inclined faces 55 and 57.

When the cam sleeve 53 is in its upper or outermost position as shown on the right-hand side of FIG. 3, the pegs 52 lie at the lower ends of the thus formed cam slots and the locking members 15 are therefore held in retracted positions by the faces 55 and 57. Inward or downward movement as viewed in the drawing, of the cam sleeve 53 causes the pegs 52 to ride up the faces on the cam sleeve 53, thus pivoting the locking members 15 outwardly towards their locking positions, the final part of the inward movement of the cam sleeve 53 bringing the pegs 52 opposite the flat portion of the face 55 on the cam sleeve 53 so that a radially inwardly directed force acting thereon due to a tendency of the locking members to move towards their retracted position, is perpendicular to the flat faces has no component tending to urge the sleeve outwardly, and the locking members are positively locked in the locked position. The locking members 15 are shown in the locked position on the left-hand side of FIG. 3. Conversely, outward movement of the cam sleeve 53 causes the locking members to be retracted by co-operation of the pegs 52 with the faces 55 and 57.

Subsidiary locking means is provided which, as described with reference to the embodiment shown in FIGS. 1 and 2 prevents the locking members 15 from being retracted until the pressure on both the inner and outer sides of the plug is equalized.

Accordingly, a valve arrangement 28 similar to that described with reference to FIG. 1 is incorporated, the valve stem 30 having a smaller diameter portion 37 and a larger diameter portion 36 as described previously. The locking device comprises a ball 58 contained in a bore 59 which communicates between the stepped bore 29 and the outer peripheral surface of the main body 3 on which the cam sleeve is slidable. The cam sleeve 53 has a chamfer 60 on its upper inner peripheral edge. The ball 58 is urged by the larger diameter portion 36 of the valve stem 30 to a position in which it projects beyond the peripheral surface of the main body 3 as shown in FIG. 3. Thus, when the cam sleeve is in the innermost position and the locking members 15 are in the locked position the ball 58 is jammed between the chamfer 60 and the larger diameter portion 36 of the valve stem 30 so that the cam sleeve cannot be moved to its outermost position to enable the locking members to be retracted.

Movement of the cam sleeve 53 is controlled by a control ring 62 which is axially slidable in an outer ring 63 secured to the body 3 of the plug through an attachment plate 64. The cam sleeve 53 is connected to the control ring 62 by volts which extend through orifices in the plate 64 and is maintained in correct positional relationship thereto by tubular distance pieces 61, through which the bolts pass. The lower face of the attachment plate 64 provides a stop to limit the outward movement of the cam sleeve 53. The inward movement of the cam sleeve 53 is limited by the pegs 52 abutting the top of the cam slot formed between the two faces 55 and 57.

Further locking means may be provided by a locking pin 65 to positively lock the control ring 62 to the outer ring 63 when the locking members 15 are in the locking position. Thus when the control ring 62 is in its innermost position an orifice therein is aligned with an orifice in the outer ring 63. The locking pin may then be passed through both the control ring and the outer ring until a head 67 on the locking pin abuts the inner face of the control ring 62 and may be secured in this position by a padlock 66, the hasp of which passes through a bore in the shank of the locking pin 65.

As with the previous embodiment, the plug is intended to be manipulated for insertion and removal from the opening in the conduit by a charge machine. Before the charge machine can be secured to the plug the locking pin 65 and padlock 66 must be removed. The charge machine for this embodiment does not need the outer sleeve described previously. Thus, when the charge machine is coupled to the plug, the inner sleeve of the grab device engages the axially projecting end of the valve stem 30 and moves it to unseat the valve seal 31 from the seat 2 which moves the larger diameter portion 36 of the valve stem from the orifice 59. The control ring 62 may then be moved outwardly by the grab device the ball 58 being urged into the orifice 59 by the chamfer 60 on the cam sleeve 63 so that the cam sleeve may then be moved to its outermost position to retract the locking members 15 to the position shown on the right-hand side of FIG. 3 when the plug may be withdrawn from the opening. Thus, as in the previous embodiment, the plug may be removed only if the grab device is properly coupled to the plug and the interior of the conduit is in communication with the charge machine so that the pressures on both sides of the plug are equalized.

It will be understood that the charge machine will be so interlocked with the plug that it cannot be disengaged from the plug until the latter is securely locked in position in the opening, but the interlocking means for this purpose form no part of the present invention.

I claim:

1. A plug including a body having an inner end adapted to make a fluid tight joint with a peripheral surface on the wall of a member surrounding the said plug, said wall having abutments axially spaced outwardly from the inner end of said plug, locking means comprising a plurality of locking members pivotally mounted on the plug body, cam means operatively engaging said locking members, said cam means comprising a cam ring movable relative to the plug body, said cam ring having cam slots, the locking members each having a cam follower engageable in a cam slot in the cam ring, movement of the ring relative to the body causing each of the cam followers to move along the associated cam slot to thereby pivot the locking members between a retracted position and a locking position, in which locking position the locking members project laterally outwardly beyond the periphery of the plug to engage said abutments in the said wall to prevent the plug from being withdrawn from the member.

2. The combination set forth in claim 1 in which the locking members comprise strut-like members each having a locking shoulder, said locking shoulders when the locking members are in the locking position projecting laterally outwardly to engage said abutments, the arrangement being such that a force applied to the locking members by the tendency of the plug to withdraw from the opening is a substantially compressive force.

3. A plug as claimed in claim 1 in which the cam ring is rotatably movable relative to the body.

4. A plug as claimed in claim 1 in which the cam ring is slidable axially relative to the plug body.

5. A plug as claimed in claim 1 in which the cam ring is provided with abutment means which, when the locking members are in their locking positions, are engaged thereby, the said abutment means being so arranged that a force applied to said means by the locking members, due to a tendency of the said locking members to move towards their retracted position, has no component acting in a direction to move the cam ring to retract the locking members.

6. A plug as claimed in claim 1 in which subsidiary locking means is provided carried by said cam ring and operatively engaging said plug body to prevent relative movement of the cam ring and the plug body when the main locking members are in their locking position.

7. A plug as claimed in claim 6 in which the cam ring has a notch therein, the subsidiary locking means comprises at least one lever including a locking portion and a release portion, means normally biasing said lever to a locking position in which the locking portion is engaged with said notch to thereby prevent the said relative movement, said locking portion being movable to a release position when said release portion is actuated.

8. A plug as claimed in claim 1 in which an additional locking device is provided to prevent relative rotation of said cam ring and plug body, said locking device comprising an abutment member carried by said cam ring and a locking member movable into the path of said abutment member to restrain rotation of said cam ring, and means normally retaining said locking member in the path of movement of said abutment member.

9. A plug as claimed in claim 8 in which the plug body has a passageway therethrough parallel to the axis thereof, said passageway having a valve seat near its inner end, the locking member comprises a valve stem slidably mounted in said passageway, said stem having a valve member at one end, means resiliently urging to said stem outwardly to retain said valve member against said seat to restrain flow of fluid through said passageway and to retain said locking member in locking position with respect to said abutment member to restrain rotation of said cam ring.

10. A plug as claimed in claim 9 in which the valve stem has stepped larger and smaller diameter portions, the larger diameter portion, when the locking member is in locking position being in the path of movement of said abutment member to restrain rotation of said cam ring, movement of the locking member to an open position moving the smaller diameter portion of the valve stem into register with the abutment member to thereby permit rotation of said cam ring.

11. A plug as claimed in claim 9 in which said valve stem has a passageway therethrough, said passageway being closed when said valve member is retained against said seat, thereby preventing equalization of the pressure on both sides of the plug to prevent movement of the locking member away from said abutment member so long as there is a pressure difference across the plug.

* * * * *